W. R. KENDALL.
INSERTIBLE SAW TOOTH.
APPLICATION FILED DEC. 4, 1913.
1,095,883.
Patented May 5, 1914.
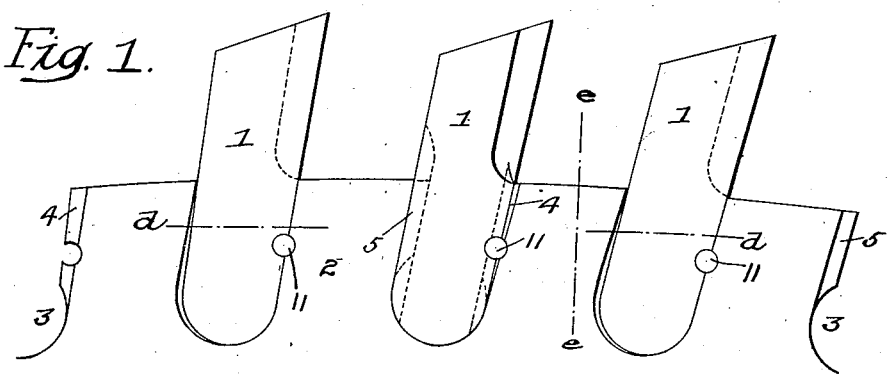
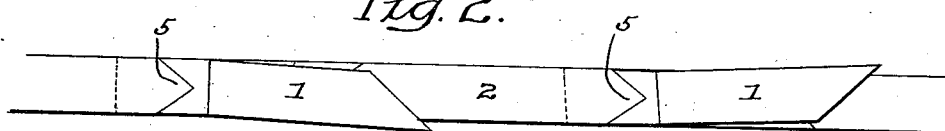
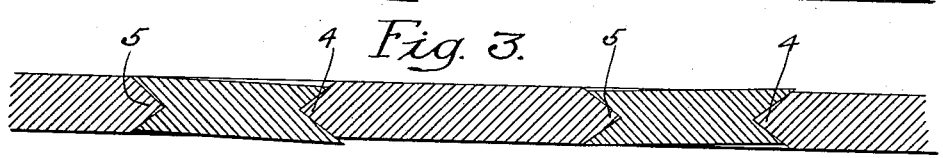
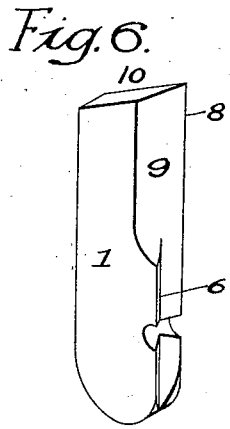
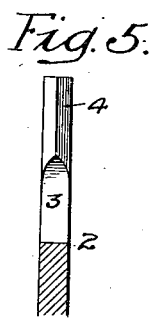
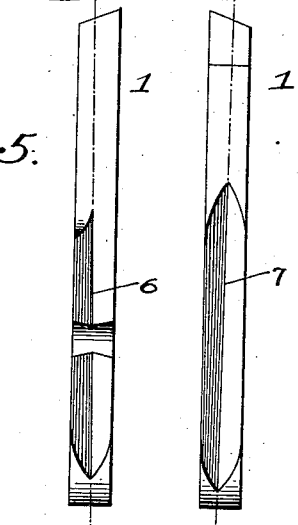
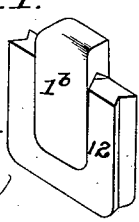
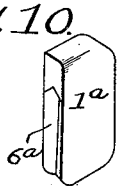
Inventor:
William R. Kendall
by his Attorneys

UNITED STATES PATENT OFFICE.

WILLIAM R. KENDALL, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

INSERTIBLE SAW-TOOTH.

1,095,883.  Specification of Letters Patent.  Patented May 5, 1914.

Application filed December 4, 1913. Serial No. 804,690.

*To all whom it may concern:*

Be it known that I, WILLIAM R. KENDALL, a citizen of the United States, residing in Philadelphia, Pennsylvania, have invented certain Improvements in Insertible Saw-Teeth, of which the following is a specification.

My invention relates to certain improvements in the construction of saws having insertible teeth in which the teeth are so set in the blade as to give the necessary clearance.

The object of this invention is to set the tooth at an angle in respect to the blade so as to give the necessary set by forming the groove or the rib on the tooth at an angle in respect to the center line of the tooth so that when the tooth is inserted in the recess of the blade it will have the desired set.

In the accompanying drawings: Figure 1 is a side view of a circular saw having inserted teeth made in accordance with my invention; Fig. 2 is a plan view; Fig. 3 is a sectional view on the line $d$—$d$, Fig. 1; Fig. 4 is a sectional view on the line $e$—$e$, Fig. 1; Fig. 5 is a sectional view of the blade through one of the recesses; Fig. 6 is a perspective view of one of the teeth; Fig. 7 is a front view of one of the teeth; Fig. 8 is a rear view of one of the teeth; Fig. 9 is a sectional plan view illustrating a modification; Fig. 10 is a perspective view of a metal cutting tooth made in accordance with my invention; and Fig. 11 is a tooth located in a carrier and made in accordance with my invention.

Referring to the drawings, 1, 1 are the teeth and 2 is the blade having recesses 3 for the reception of the teeth. The teeth, as illustrated in Fig. 1, are formed for cutting wood, but they can be made to cut metal, as illustrated in Figs. 10 and 11. The front wall of each recess 3 has a rib 4 and the rear wall has a rib 5. These ribs are formed parallel with the sides of the blade, as illustrated in Fig. 5, and are V-shaped in cross section. In the front of each tooth 1 is a groove 6 and in the rear of the tooth is a groove 7. These grooves are arranged at an angle in respect to the sides of a tooth. The groove 6 is also arranged at one side of a center line $x$—$x$ through the tooth, so that when a tooth is located in the recess 3 the cutting edge 8 will project beyond the side of the blade 2, as shown in Fig. 4, to give the tooth the necessary set. The tooth, as illustrated in Fig. 6, is beveled at 9 to form this cutting edge and is preferably beveled at the top for clearance, as indicated at 10. In some instances, the rear rib may be parallel with the sides of the tooth or may be more or less inclined with respect to the line of the tooth, as desired. The teeth are preferably held in place by a rivet 11 or other suitable fastening.

It will be understood that the shape of the recess and the shape of the tooth may be varied according to the character of the tooth.

In Fig. 10, I have illustrated a tooth $1^a$ having an inclined groove $6^a$, but the cutting edge of the tooth is blunt and it is for the purpose of cutting metal.

In Fig. 11, I have shown the tooth $1^b$ located in a carrier 12 and the carrier is grooved to fit the front and rear ribs of the blade. The grooves in the carrier may be arranged at an angle with respect to the sides thereof and the tooth may be parallel with the carrier, or the tooth may be provided with inclined grooves, as in Fig. 10, and the grooves in the carrier may be parallel with the sides thereof. In Fig. 9, I have illustrated a tooth $1^c$ mounted in a recess $2^a$ and, in this instance, the grooves are formed in the blade and the ribs are formed on the tooth.

While I have shown in Figs. 1 to 4, inclusive, the alternate teeth projecting on one side of the blade and the other teeth projecting on the other side of the blade, it will be understood that the teeth may be arranged differently without departing from the spirit of my invention. In some saws it may be necessary to use cleaner teeth which are not set, but are located in a central position.

The shape of the teeth, either for wood or for metal, may be modified without departing from the essential features of the invention, which is to make the teeth flat and of substantially the same thickness throughout so that they can be cheaply made from flat material and to shape the retaining means of the tooth or its carrier so that when it is inserted in the recess in the blade the tooth will have the proper set. When the tooth is mounted in a carrier and the sides of the carrier are parallel with the sides of the tooth and the retaining rib or recess of the carrier is arranged at an angle with respect to the sides of the carrier, then the carrier is, in fact, a part of the tooth.

I claim:

1. The combination of a blade having a recess therein; a tooth adapted to the recess; guides on the blade parallel to the sides thereof; a tooth having a guide arranged at an angle in respect to the body thereof so that when a tooth is located in a recess, its cutting edge will project beyond the side of the blade.

2. The combination in a blade having a series of recesses therein; ribs on the front and rear walls of the recesses, said ribs being parallel with the sides of the blade; a series of teeth mounted in the recesses and having grooves arranged to receive the ribs, the grooves of the teeth being at an angle in respect to their sides so that the cutting edge of each tooth will have the set desired.

3. A flat tooth adapted to be inserted in a saw blade having a cutting edge and a guide arranged to fit a guide in the blade; the guide of the tooth being at an angle in respect to the sides of the tooth.

4. A saw tooth of an even thickness throughout and having straight sides; a cutting edge at the front; front and rear grooves arranged to receive the ribs on a blade, both grooves being arranged at an angle with respect to the sides of a tooth and the front groove being off center so that, when a tooth is located in the blade, it will have the necessary set.

In testimony whereof, I have signed my name to this specification, in the presence of two subscribing witnesses.

WILLIAM R. KENDALL.

Witnesses:
W. C. BURKHOLDER,
E. B. ROBERTS.

---

Copies of this patent may be obtained for five cents each, by addressing the "Commissioner of Patents, Washington, D. C."